Patented Sept. 10, 1929.

1,727,847

UNITED STATES PATENT OFFICE.

JOHN RAYMOND WHITE, OF NEW YORK, N. Y., ASSIGNOR OF ONE-HALF TO HENRY LEEDS, OF LONG ISLAND CITY, NEW YORK.

PROCESS OF PRODUCING YEAST.

No Drawing. Application filed April 29, 1927, Serial No. 187,707. Renewed January 31, 1929.

This invention relates to yeast, yeast products and process of making the same.

Where I have attempted to properly mature bread dough, utilizing yeast as the leavening agent and adding ordinary salt or hydrohalogen acid compounds of sodium as a means to control the maturing process and activate the gluten of the flour, I have found that this seasoning or modifying agent inhibits the proper action of the yeast, prolonging the maturing process and correspondingly increasing the cost of bread making by increasing the amount of yeast used if such maturing time is attempted to be shortened. Thus, the addition of ordinary salt or a compound such as potassium bromate, potassium iodate, iodic or bromic acid or a combination of ordinary salt and a sodium compound of one of the halogen-oxygen acids compound mentioned acts in a manner which may be termed toxic to yeast known to me as developed by the ordinary process. The toxic or retarding action of dough compounds such as ordinary salt or the hydrohalogen acid compounds upon yeast I attribute largely as the cause of the extended time necessary for maturing bread dough or the excessive use of yeast to shorten the maturing period.

I have discovered that in the process of making yeast from fermentable materials such as sacchariferous materials, particularly molasses, the addition of so-called nutrient compounds calculated to increase the propagation of the yeast, though innocuous to the propagation when used in the presence of quantities of salt normally used in making bread or other agents calculated to enhance its properties, has the retarding effect previously mentioned, necessitating a prolonged maturing time or an increased use of the yeast. I have discovered that I can produce a yeast which is substantially acclimatized to dough modifying ingredients, such as salt or a mixture thereof with iodic or bromic acid or a halogen-oxygen compound of sodium or potassium, to increase the maturing properties of the yeast, shorten the maturing period and correspondingly reduce the quantity of yeast for proper leavening of bread by propagating yeast in a sacchariferous solution containing a salt medium or salt and an alkali-metal compound of a halogen-oxygen acid, preferably omitting the so-called nutrient salts or compounds which have been found to be unfavorable to an acidity control of the propagating medium.

A yeast so grown is further characterized by its freedom from putrefiable bacteria and therefore having a high order of keeping property. Furthermore, the yeast is highly palatable for direct consumption where it is recommended for its medicinal properties. The appearance of the product is enhanced, characterized by an apparent bleaching effect of the propagating medium upon the yeast.

For the practice of my invention I provide a sacchariferous medium of 4 to 10 Brix. Preferably I utilize a sacchariferous medium comprising molasses of the strength described. To this medium, in quantities of approximately one gallon, I add a yeast seed cell after first incorporating with the sacchariferous material ordinary common salt (sodium chlorid). The salt is added in quantities to be present in the molasses in percentages varying from ½ to 5%. It is preferred to maintain the strength of the salt solution at about 3%. Under the conditions described, fermentation is permitted until it ceases. The batch previously prepared is added to twice the amount of molasses, modified by the salt as previously described. In this bath fermentation is permitted to continue until it ceases. A yeast so made may be utilized as commercial seed yeast wherein it may be added to saline modified molasses or sacchariferous mediums in proportions of a hundred gallons of the commercial seed yeast molasses to 1000 gallons of fresh molasses.

For the preparation of commercial yeast having the properties previously described, it is preferred to propagate the yeast in six successive stages in the saline medium of common salt or common salt to which there has been added a halogen acid compound such as iodic or bromic acid or the alkali metal or alkalin earth metal compound of iodic or bromic acid, such as sodium bromate, sodium iodate, calcium iodate or bromate. Where I use the iodates, bromates or haligen-oxygen acid compounds, I may add from .005 to .75% of any of these compounds, in addition to ½ to 5% of salt, to the sacchariferous medium.

It will be understood that where I use molasses I have found that this medium normally contains sufficient nutrients for proper propagation of yeast in accordance with my process. Under certain conditions I may, however, add salts which do not adversely affect the acidity factor resulting from fermentation or as a result of a previously digested sacchariferous material utilizing sulphuric or hydrochloric acid. An acidity of 2°, corresponding to $\left(\frac{N}{5}\right)$ solution, is preferably maintained. It will also be observed that I may add compounds including the phosphate radical, that is $PO_4$, under certain conditions where the sacchariferous material above mentioned may be low in this component, with desirable effects.

It will be further observed that I may maintain the concentrations of the saline materials constant throughout the period of propagation. Under such conditions, however, it is preferred to vary the strength of the sacchariferous material within the limits mentioned, beginning with the stronger concentration and tapering down to the lower concentration.

I have found that the addition of the salt or the other halogen-oxygen compounds previously mentioned which may be used in combination with salt act as an acidity control for the proper propagation of yeast. It is still further found that the salt serves to assist the yeast in the assimilation of the nutrient ingredients in the sacchariferous material, such as molasses, for proper and rapid growth thereof; that the percent of the saline materials mentioned, particularly the salt, remains substantially unaltered during successive generations of propagation and that throughout the propagation and growth of the yeast, it serves as an antiseptic medium, preventing the growth of putrefiable bacteria. Yeast prepared as a result of the successive stages of propagation is suitably separated from the medium, preferably by filtration, and then compacted by pressing. I have further found that yeast propagated in accordance with my process may be filtered more readily. The solid product resulting from filtration and compacted by pressing carries with it a certain quantity of the salt, rendering the product much more palatable for direct consumption for its medicinal value. Furthermore, propagation in the medium described has a bleaching effect upon the ingredients, resulting in a product materially enhanced in appearance by being lighter in color.

Yeast prepared in accordance with the process above described may be used with salt seasoned dough or dough made from flour including saline materials calculated to induce proper maturing of the dough, with the result that I may reduce the time for maturing under normal conditions almost 50%, that is, the maturing period may be reduced to one hour when utilizing yeast made in accordance with my invention, using the same quantity of yeast, as compared with the yeast previously made which requires an hour and a half. It will also be observed that larger quantities of salt may be added to dough for proper glutenization of the flour without retarding the leavening properties of the yeast or necessitating a larger quantity of yeast.

In short, yeast propagated in accordance with my invention is acclimated to the conditions existing in bread dough whereby the modifying ingredients of dough will not have a detrimental retarding action upon the yeast. Thus, in the preparation of bread, no sacrifice need be made in the modifying ingredients because of any detrimental effect such ingredients may have upon the yeast used for its leavening properties.

Yeast made in accordance with my invention inhibits the growth of putrefiable bacteria and its presence in the final product is in such small quantities as to give to the yeast materially lengthened keeping properties, aside from being a healthier product, suitable for direct consumption.

Though I have described the sacchariferous material as preferably molasses, sugar solutions of corresponding strength may be used and, also, for certain additional purposes fermentable solutions may be utilized with a certain amount of success, though, perhaps, not comparable to the molasses or sugar solutions, for my purposes in the production of a bread yeast.

Having thus described my invention and illustrated its use, what I claim as new and desire to secure by Letters Patent, is—

1. In the process of producing yeast, the steps which comprise successively propagating seed yeast in a series of sacchariferous solutions each of which contains 0.5 to 5% of sodium chloride.

2. In the process of producing yeast, the steps which comprise successively propagating yeast in a series of sacchariferous solutions, each of which contains at least 0.5% of sodium chloride.

3. In the process of producing yeast, the steps which comprise successively propagating yeast in a series of sacchariferous solutions each of which contains about 0.5 to 5% of sodium chloride and .005 to .75% of an inorganic compound containing a halogen-oxygen acid radical.

4. In the process of producing yeast, the steps which comprise successively propagating yeast in a series of sacchariferous solutions each of which contains at least 0.5% of sodium chloride and at least .005% of potassium bromate.

5. In the process of producing yeast, the steps which include successively propagating yeast in a series of solutions each containing molasses and sodium chloride, the concentration of molasses in the series being progressively less through the same while the concentration of sodium chloride through the series is substantially constant at not less than 0.5%.

6. In a process of producing yeast, the steps which include successively propagating yeast in a series of solutions each containing molasses and sodium chloride, the concentration of the molasses through the series varying from 10° to 4° Brix and being progressively less through the series while the sodium chloride through the series is at a concentration from 0.5% to 5%.

In witness whereof I have hereunto signed my name this 28th day of April, 1927.

JOHN RAYMOND WHITE.